US 010570260B2

(12) United States Patent
Richert et al.

(10) Patent No.: US 10,570,260 B2
(45) Date of Patent: Feb. 25, 2020

(54) COMPOSITE ARTICLE AND METHODS FOR MAKING THE SAME

(71) Applicant: 3M INNOVATIVE PROPERTIES COMPANY, St. Paul, MN (US)

(72) Inventors: Detlef Richert, Erkelenz (DE); Alexander M. Koenig, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 369 days.

(21) Appl. No.: 14/649,335

(22) PCT Filed: Dec. 3, 2013

(86) PCT No.: PCT/US2013/072740
§ 371 (c)(1),
(2) Date: Jun. 3, 2015

(87) PCT Pub. No.: WO2014/088999
PCT Pub. Date: Jun. 12, 2014

(65) Prior Publication Data
US 2016/0009879 A1    Jan. 14, 2016

(30) Foreign Application Priority Data

Dec. 4, 2012 (EP) .................................... 12195427

(51) Int. Cl.
C08J 5/12 (2006.01)
C09J 5/00 (2006.01)
(Continued)

(52) U.S. Cl.
CPC ............. *C08J 5/128* (2013.01); *B60J 10/35* (2016.02); *C09J 5/00* (2013.01); *C09J 7/00* (2013.01);
(Continued)

(58) Field of Classification Search
None
See application file for complete search history.

(56) References Cited

U.S. PATENT DOCUMENTS

| 3,615,972 A | 10/1971 | Morehouse, Jr. et al. |
| 4,075,238 A | 2/1978 | Mark et al. |
| (Continued) | | |

FOREIGN PATENT DOCUMENTS

| DE | 40 41 175 | 7/1992 |
| DE | 10 2009 035 813 | 2/2011 |
| (Continued) | | |

OTHER PUBLICATIONS

Machine translation of JP 2007194125 A (2007).*
PCT International Search Report from PCT/US2013/072740 dated Feb. 13, 2015, 5 pages.

*Primary Examiner* — Frank D Ducheneaux
(74) *Attorney, Agent, or Firm* — Michael Stern

(57) ABSTRACT

The invention relates to a composite article comprising: —an item (2) to be attached to a substrate; and —an adhesive tape (3) for attaching the item to the substrate, the adhesive tape having a substantially flat shape with a first main surface (6) facing the item, the first main surface extending in a cross section perpendicular to the first main surface from a first edge (8) to a second edge (9); —a lamination region (11) on the first surface, wherein the lamination region is the region where the adhesive tape is laminated to the item; and —wherein the lamination region is smaller than the first main surface. The invention also relates to a method of making a composite article.

11 Claims, 2 Drawing Sheets

(51) Int. Cl.
*C09J 7/00* (2018.01)
*C09J 123/02* (2006.01)
*C09J 133/00* (2006.01)
*B60J 10/35* (2016.01)

(52) U.S. Cl.
CPC ........ *C08J 2321/00* (2013.01); *C08J 2423/02* (2013.01); *C08J 2433/00* (2013.01); *C09J 123/02* (2013.01); *C09J 133/00* (2013.01); *C09J 2201/134* (2013.01); *C09J 2201/36* (2013.01); *C09J 2201/606* (2013.01); *C09J 2201/61* (2013.01); *C09J 2421/006* (2013.01); *C09J 2423/00* (2013.01); *C09J 2433/00* (2013.01)

(56) References Cited

U.S. PATENT DOCUMENTS

| | | | |
|---|---|---|---|
| 4,287,308 A | 9/1981 | Nakayama et al. | |
| 4,329,384 A | 5/1982 | Vesley et al. | |
| 4,330,590 A | 5/1982 | Vesley | |
| 4,379,201 A | 4/1983 | Heilmann et al. | |
| 4,391,687 A | 7/1983 | Vesley | |
| 4,415,615 A | 11/1983 | Esmay et al. | |
| 4,710,536 A | 12/1987 | Klingen et al. | |
| 4,749,590 A | 6/1988 | Klingen et al. | |
| 4,855,170 A | 8/1989 | Darvell et al. | |
| 5,589,246 A * | 12/1996 | Calhoun | C09J 7/35 428/120 |
| 5,591,290 A * | 1/1997 | Walter | C09J 7/0207 156/152 |
| 5,715,632 A | 2/1998 | Nozaki | |
| 6,153,289 A * | 11/2000 | Murray | B32B 27/08 156/277 |
| 6,958,186 B2 * | 10/2005 | Husemann | C09J 7/0242 428/346 |
| 8,652,631 B2 | 2/2014 | Zoller | |
| 2006/0078702 A1 | 4/2006 | Velard | |
| 2011/0076489 A1 | 3/2011 | Nonaka et al. | |

FOREIGN PATENT DOCUMENTS

| | | |
|---|---|---|
| EP | 0 384 598 | 8/1990 |
| EP | 1 262 532 | 12/2002 |
| GB | 1 584 121 | 2/1981 |
| JP | 2000-168366 | 6/2000 |
| JP | 2007-194125 | 8/2007 |

* cited by examiner

COMPOSITE ARTICLE AND METHODS FOR MAKING THE SAME

The invention relates to a composite article, comprising an item to be attached to a substrate and an adhesive tape for attaching the item to the substrate, the adhesive tape being laminated to the item. The invention further relates to a method of making the composite article as well as to a vehicle comprising the composite article.

The item according to the invention may for example be a shaped rubber article. Shaped rubber articles comprising for example, ethylene-propylene copolymers, ethylene propylene-diene terpolymers or styrene-butadiene copolymers are frequently used for the preparation of gaskets and automotive weatherstrip seals. The elastomers are typically attached to a substrate, for example, an automobile frame by means of a pressure-sensitive adhesive film which provides easy handling and performance advantages such as excellent sealing and low weight compared to other systems like liquid adhesives or mechanical attachment.

Rubbers are low surface energy materials having various degrees of elasticity which do not bond effectively to adhesives in general and, in particular, to pressure-sensitive adhesives. Different methods have been proposed so far to provide durable bond between rubber materials and the pressure-sensitive adhesive.

EP 0 384 598 describes a dual-functional adhesive tape comprising a polyolefin heat-activatable adhesive layer, and a release liner. The heat-activatable adhesive layer comprising the heat-activatable layer, the primer layer, the pressure-sensitive adhesive layer, and the release liner is heat-laminated to a shaped rubber article by using specifically designed equipment. The liner is removed from the pressure-sensitive adhesive layer and the resulting composite structure is pressure-bonded to the respective surface.

EP 1 262 532 A1 also describes a dual-functional tape which is used for bonding e.g. rubber gaskets in a vehicle, in particular a motor vehicle such as a car. The tape comprises a heat-activatable adhesive resin layer as well as a pressure-sensitive adhesive layer and may be bonded to e.g. a shaped rubber gasket via a lamination process using conventional heat-bond laminating equipment.

DE 10 2009 035 813 A1 discloses a shaped rubber article used as a seal or gasket in a vehicle. The shaped rubber article is attached to the vehicle body with a double sided elongated tape. Usually the tape is bonded over its entire width to the shaped rubber article on the one side and to the vehicle body on the other side.

It has been found, that such a construction may have a tendency of delamination, especially in certain mounting conditions, for example in mounting conditions in which due to e.g. the mounting geometry a force is applied to the shaped rubber article. Such mounting conditions may for example be S-shaped or negative curved conditions or irregularities in the surface of the vehicle body, such as for example weldingspots.

In view of the above there is a need to provide an improved composite article comprising an item to be attached to a substrate as well as an adhesive tape for attaching the item to the substrate with improved bonding characteristics.

According to the invention this can be achieved by providing a composite article comprising:
an item to be attached to a substrate; and
an adhesive tape for attaching the item to the substrate, the adhesive tape having a substantially flat shape with a first main surface facing the item, the first main surface extending in a cross section perpendicular to the first main surface from a first edge to a second edge;
a lamination region on the first surface, wherein the lamination region is the region where the adhesive tape is laminated to the item; and
wherein the lamination region is smaller than the first main surface.

The item may be a shaped rubber article such as a seal or a gasket. The shaped rubber article may be made out of for example, ethylene-propylene copolymers, ethylene propylene-diene terpolymers or styrene-butadiene copolymers. The item may also be any other kind of article to be attached to a substrate such as for example a hook or a handle etc. The substrate may be a substrate of a vehicle, e.g. a passenger vehicle; e.g. a metal surface in a vehicle. The substrate may also be a motor vehicle body. The substrate may also be any other kind of surface in any other kind of application, e.g. a plastic surface, a glass surface or a wooden surface etc.

The adhesive tape for attaching the item to the substrate has a substantially flat shape with a first surface and a second surface. The surfaces may be parallel to each other. Both surfaces may extend in a cross section perpendicular to the first surface and the second surface from a first edge to a second edge.

The composite article comprises a lamination area. The lamination area may be described as an area where the adhesive tape is bonded to the item.

According to the invention the lamination region is smaller than the first main surface of the adhesive tape. In other words regions of the first main surface are laminated to the item and other regions of the first main surface are not laminated to the item although they face the item. By making the lamination area smaller than the first surface of the adhesive tape it is possible to determine the areas of the adhesive tape in which a force introduced over the seal is lead into the adhesive tape.

The adhesive tape for attaching the item to the substrate may comprise a heat-activatable adhesive layer and a pressure-sensitive adhesive layer, wherein the heat-activatable adhesive layer faces the item and is laminated to the item. The heat-activatable adhesive layer may be a resin layer, wherein the resin is a polymer of one or more monomers selected from the group consisting of olefins. Suitable commercially available heat-activatable polyolefins include poylpropylene copolymers of the trade name Finapro™, such as those of the designation Finapro™ 5660, Finapro™ 8780, Finapro™ 5642, and Finapro™ 5712 (available from ATOFINA Petrochemichals), ethylene/propylene copolymers of the trade name Eltex P™, such as KS 414, KS 409, or KL 467 (available from Solvay Polymers), or those of the trade designation Novolen™, such as MC 3200 (available from Targor GmbH, Ludwigshafen, Germany).

The pressure-sensitive adhesive layer may comprise an acrylic-type pressure sensitive adhesive. Further examples for the heat-activatable adhesive layer and the pressure-sensitive adhesive layer will be described below.

The lamination region may be continuous or discontinuous. Depending on the application of the composite article it is possible to have a continuous lamination region, which extends over the first main surface without any disruption or gap, where the tape is not laminated to the item. The lamination region may also be discontinuous with regular and/or irregular disruptions or gaps. The discontinuity may for example be regular in the direction of a lamination direction and/or of a direction a force is going to be applied to the item.

The lamination region may extend in the cross section perpendicular to the first main surface from the second edge up to a certain distance from the first edge. The region or area where the first main surface is not laminated to the item is positioned next to one of the edges. Depending on the application of the composite article and the geometric shape of the substrate the composite article is attached to, the positioning of the lamination region may be selected.

The lamination region is arranged such, that in the cross section perpendicular to the first main surface it has the same distance to the first edge as to the second edge. Such an arrangement is symmetric and provides on each side an region or area, where the adhesive tape is not laminated to the item. With such an arrangement every force that is introduced into the seal is lead in the tape mainly into its central region or area.

The composition article according to any of the preceding claims, wherein the width of the main surface in the cross section perpendicular to the first main surface is between 4 mm and 22 mm, preferably between 6 and 16 mm and more preferably about 8 and 11 mm. These ranges may used, when the item is a seal for a vehicle body, such as for example a seal for a door.

The composition article according to any of the preceding claims, wherein the distance from at least one edge to the lamination region in the cross section perpendicular to the main surface is between 0.5 mm and 4 mm more preferably about 2 mm.

The Invention also relates to a method of making a composite article according to any of the preceding claims, comprising the steps of:
  providing an item to be attached to a substrate;
  providing an adhesive tape for attaching the item to a substrate, the adhesive tape having a substantially flat shape with a first main surface facing the item;
  laminating the adhesive tape to the item, such that a lamination region between the item and the adhesive tape, where the adhesive tape is laminated to the item, is smaller than the first main surface.

According to the invention, the adhesive tape may be activated by Infrared (IR) and/or Near-Infrared (NIR). A masking method or focusing may be used to only activate the lamination region (selectively activate).

Furthermore the invention relates to a motor vehicle comprising a composite article according to the above description.

Heat-Activatable Layer

The adhesive resin used in the heat-activatable adhesive resin layer in accordance with the present invention is a polymer of one or more olefinic monomers and is hereinafter also referred to as a heat-activatable polyolefin.

The term "heat-activatable" is conventionally used in the art of adhesive technology and means that in order to "activate" the adhesive it needs to be subjected to a heat treatment, typically between about 60° C. and about 200° C., so as to allow the heat-activatable resin layer to bond to the desired substrate. It is preferred that the surface of the HAA layer be softened applying temperature near its softening point, most preferably slightly above its melting point to achieve a good bond.

Examples of useful heat-activatable polyolefin resins are polyolefin homopolymers, such as polyethylene, polypropylene, polyolefin/polyolefin copolymers, such as ethylene/propylene copolymers (often referred to as polyallomer) and blends thereof.

Suitable blends include blends of polyethylene and polypropylene at various ratios. Suitable copolymers may be atactic, isotactic, random, block or impact copolymers.

Preferred heat-activatable polyolefin resins of the invention effectively adhere to both thermoplastic and thermoset substrates. The adhesives achieve a high degree of compatible interfacial mixing with a thermoplastic substrate while molten, which upon cooling yields a high-strength bond. With a thermoset substrate, the molten adhesives achieve a superior wetting out of the substrate surface, again yielding a high bond strength when cooled.

In one embodiment of the present invention, a propylene/ethylene copolymer having an ethylene content of up to about 10% by weight is preferred for use in the heat-activatable adhesive resin layer.

Polyolefin polymers which have been toughened and made impact resistant by means of incorporation of elastomeric segments into the polymeric chain my also be useful. Suitable impact copolymers include impact copolymer based on polypropylene or on polyethylene, for example impact polypropylene copolymer containing an ethylene-propylene elastomeric phase.

In another embodiment, the resin is a blend of polyethylene and polypropylene. Preferably, the polyethylene is used in an amount of 5 to 30% by weight, more preferably of 10 to 23% by weight, based on the total weight of the blend and the polypropylene is used in an amount of 95 to 7% by weight, more preferably in an amount of 90 to 75% by weight, based on the total weight of the blend.

The heat-activatable adhesive resin in accordance with the present invention preferably exhibits one of the features selected from a melting point of about 120 to about 170° C. (preferably of about 130 to about 165° C.), a melt flow index of about 2 to 18 g/10 Min (preferably of about 5 to 9 g/10 min), a tensile strength at break of about 25 to about 45 $N/cm^2$ (preferably between 30 to 40 $N/cm^2$), an e-modulus at 100% elongation of about 10 to 20 $N/cm^2$ (preferably of about 12 to about 16 $Ncm^2$), and an elongation at break of about 200 to about 450% (preferably of about 230 to about 400%). More preferably, the heat-activatable adhesive resin exhibits at least two, more preferably at least three, and even more preferably all of the aforementioned features.

Suitable commercially available heat-activatable polyolefins include polypropylene copolymers of the trade name Finapro™, such as those of the designation Finapro™ 5660, Finapro™ 8780, Finapro™ 5642, and Finapro™ 5712 (available from ATOFINA Petrochemichals), Ethylene/Propylene Copolymers of the trade name Eltex P™, such as KS 414, KS 409, or KL 467 (available from solvay Polymers), or those of the trade designation Novolen™ (TMI, such as MC 3200 (available from Targor GmbH, Ludwigshafen, Germany)).

The thickness of the HAA layer is determined by the end-use of the adhesive tape typical thicknesses being in the range of about 30 to 300 μm.

Pressure-Sensitive Adhesive Layer

The pressure-sensitive adhesive layer in accordance with the present invention comprises an acrylic-type pressure-sensitive adhesive. Preferably, the pressure-sensitive adhesive layer essentially consists of an acrylic-type pressure-sensitive adhesive.

Useful acrylic type pressure-sensitive adhesives include those known to the person skilled in the art. Particularly useful pressure-sensitive adhesives include ultraviolet-radiation polymerized acrylic pressure-sensitive adhesives. Preferably, these pressure-sensitive adhesives are prepared from a composition comprising at least one alkyl acrylate monomer, preferably a monofunctional unsaturated acrylate ester of a non-tertiary alcohol, the molecules of which preferably have from about 4 to about 14 carbon atoms. Such monomers include, e.g., isooctyl acrylate, 2-ethyl hexyl acrylate, isononyl acrylate, decyl acrylate, dodecyl acrylate, butyl acrylate, and hexyl acrylate. The alkyl acrylate monomers can be used to form homopolymers or they can be copolymerized with polar copolymerizable monomers. When copolymerized with strongly polar copolymerizable monomers, the alkyl acrylate monomer generally comprises at least about 75% of the photopolymerizable polymers. When copolymerized with moderately polar copolymerizable monomers, the alkyl acrylate monomer generally comprises at least about 60% of the photopolymerizable polymer.

The polar copolymerizable monomers can be selected from strongly polar copolymerizable monomers such as acrylic acid, itaconic acid, hydroxyalkyl acrylates, cyanoalkyl acrylates, acrylamides or substituted acrylamides, or from moderately polar copolymerizable monomers, such as N-vinyl pyrrolidone, acrylonitrile, vinyl chloride, or diallyl phthalate. When strongly polar monomers are used, they preferably comprise from about 1 to about 25 parts, preferably from about 4 to about 20 parts of the acrylic copolymer. When moderately polar monomers are used, they preferably comprise from about 20 to about 40 parts of the acrylic copolymer.

The composition comprising the polymerizable monomers may also contain a photoinitiator in order to induce polymerization of the monomers. Useful photoinitiators include benzoin ethers, such as benzoin methyl ether or benzoin isopropyl ether, substituted benzoin ethers, such as anisole methyl ether, substituted acetophenone derivatives, such as 2,2-diethoxyacetophenone and 2,2-dimethoxy-2-phenylacetophenone, substituted alpha-ketols, such as 2-methyl-2-hydroxypropiophenone, aromatic sulfonyl chlorides, such as 2-naphthalene sulfonyl chloride and photoactive oximes, such as 1-phenyl-1-1-propenedione-2(0-ethoxycarbonyl)-oxime. Preferably, the photoinitiator is present in an amount of about 0.01 to about 1 part per hundred parts (pph) of the acrylic monomers of the pressure sensitive adhesive compositions.

The photopolymerizable composition may also contain a crosslinking agent to enhance heat-resistance. Preferred crosslinking agents for acrylic pressure-sensitive adhesives are multifunctional acrylates such as 1,6-hexanediol diacrylates as well as those disclosed in U.S. Pat. No. 4,379,201, such as trimethylolpropane triacrylate, pentaerythritol tetraacrylate, 1,2-ethylene glycol diacrylate, and 1,2-dodecanediol diacrylate. Other useful crosslinking agents include substituted triazines, such as those disclosed in U.S. Pat. Nos. 4,329,384, 4,391,687, 4,330,590, e.g., 2,4-bis(trichloromethyl)-6-(3,4-dimethoxyphenyl)-s-triazine and other chromophore halogen-s-triazines. When used, the crosslinking agent is present in an amount of from about 0.01 to about 1 pph, wherein pph means (additional) parts per hundred parts of the total composition.

In one preferred embodiment, the pressure sensitive adhesive layer comprises an acrylic cellular pressure-sensitive adhesive membrane as described in U.S. Pat. No. 4,415,615. A cellular pressure-sensitive adhesive membrane is made by the steps of (a) frothing a composition which is polymerizable to a pressure-sensitive adhesive state, (b) coating the froth onto a backing, and (c) polymerizing the coated froth in situ to a pressure-sensitive adhesive state to provide a pressure-sensitive adhesive membrane having a cellular structure.

Frothing can be conveniently accomplished by whipping a gas into the polymerizable composition. After coating the frothed composition onto a backing, the polymerization may be initiated by ultraviolet radiation as taught in U.S. Pat. No. 4,181,752. Where such photopolymerization is desired, an inert frothing gas is preferably used as air tends to quench photopolymerization. Carbon dioxide and nitrogen are preferred frothing gases.

In another preferred embodiment, the pressure sensitive adhesive layer may be a foam-like layer. Such foam-like adhesive layers may be prepared from a monomer composition comprising microspheres. Suitable microspheres include glass or polymeric microspheres. The microspheres should have an average diameter of 10 to 200 micrometers, and comprise from about 5 to about 65 volume percent of the core layer. The thickness of foam-like layers in preferred tapes of the present invention ranges from 0.3 mm to about 4.0 mm in thickness.

Preferred glass microspheres have average diameters of about 50 mu m. When glass microspheres are used, the pressure sensitive adhesive layer should be at least 3 times as thick as their diameter, preferably at least 7 times. The thickness of layers containing such glass microspheres should be at least six times, preferably at least twenty times that of each microsphere-free layer.

Polymeric microspheres are also useful for some compositions such as those described in U.S. Pat. Nos. 3,615,972, 4,075,238, 4,287,308, and 4,855,170. Such microspheres are available from Kema Nord Plastics under the trade name "Expancel" and from Matsumoto Yushi Seiyaku under the trade name "Micropearl". In expanded form, the microspheres have a specific density of approximately 0.02-0.036 g/cc. It is possible to include the unexpanded microspheres in the core layer and subsequently heat them to cause expansion, but it is generally preferred to mix in the expanded microspheres. This process ensures that the hollow microspheres in the final core layer are substantially surrounded by at least a thin layer of adhesive.

In a highly preferred embodiment, the adhesive tape of the present invention may comprise a second pressure-sensitive adhesive layer. Such second layer consists of a polymerized acrylic copolymer which may incorporate similar or dissimilar acrylic monomers in like or unlike thicknesses, having similar or different additives from those acrylic copolymers contained in the first pressure-sensitive adhesive layer. In such an embodiment, one layer is preferably a foam-like pressure-sensitive acrylic adhesive and the second layer is a non-foam-like pressure-sensitive acrylic adhesive.

Other useful materials which may be blended into the first and/or second pressure-sensitive adhesive layer include fillers, pigments, fibrous reinforcing agents, woven and non-woven fabrics, foaming agents, antioxidants, stabilizers, fire retardants, and viscosity adjusting agents.

An especially useful filler material is hydrophobic silica as disclosed in U.S. Pat. Nos. 4,710,536 and 4,749,590. In one preferred embodiment of the present invention, the pressure-sensitive adhesive layer further comprises from about 2 to about 15 pph of a hydrophobic silica having a surface area of at least 10 $m^2$/g.

The pressure-sensitive adhesive compositions may be prepared by premixing together the photopolymerizable monomers and the photoinitiator. This premix is partially polymerized to a viscosity range of from about 500 cps to about 5,000 cps, as measured according to ASTM 4016/93, to achieve a coatable syrup. Alternatively, the monomers may be mixed with a thixotropic agent such as fumed hydrophilic silica to achieve a coatable thickness. The crosslinking agent(s) and any other optional ingredients are added to the syrup prior to in situ crosslinking and polymerization.

Another especially useful filler material are silica particles that have a high surface area relative to silicas that are typically added as fillers in pressure sensitive adhesives such as disclosed in WO 2010/147888. In one preferred embodiment, the surface area of silica is at least 300 square meters per gram as measured according to ASTM D1993-03(2008) "Standard Test Method for precipitated silica-surface area by Multipoint BET Nitrogen Adsorption" and is included in preferably small amounts of 0.3 to 1.5 parts by weight silica per 100 parts of polymer resin in the foam-like pressure sensitive adhesive layer of the current invention.

Construction and Method of Making

The adhesive tape of the present invention is particularly useful for attaching rubber articles (by means of the heat-activatable layer) to a variety of surfaces (by means of the pressure-sensitive adhesive layer), as is desired in the automotive industry. The heat-activatable layer of the adhesive tape in accordance with the present invention provides excellent adhesion to a wide variety of rubbers and low surface energy elastomers.

In order to bond a rubber article for example a shaped rubber article to the heat activatable layer, an optional support layer on the first main surface may be removed. Lamination may be performed according to methods known in the art using conventional heat-bond laminating equipment, such as a Heat-Bond-Laminator Model TE 2417 available from EHVO GmbH, Germany. Typically, a sufficient amount of heat is first applied in order to activate the heat-activatable layer. For instance, the heat activatable layer may be preheated using an atmosphere of air having a temperature of up to about 650° C. The preactivated tape is laminated to the desired rubber article using an appropriate amount of pressure. The pressure-sensitive adhesive layer may serve to finally attach the resulting composite article to a variety of surfaces, for instance to a metal surface of a car. Instead of using an atmosphere of air having a temperature of up to about 650° C., it is also possible to use IR or NIR lamination, where the layer is activated by IR or NIR radiation.

In order to achieve the claimed composite article with a lamination region being smaller as the first main surface of the adhesive tape, it is possible to only activate parts of the heat activatable layer. For the process, where hot air is used to activate the tape, it is possible to use specifically shaped air outlets, like specifically shaped nozzles or other applicable protection device, that direct the hot air only to specific regions of the adhesive tape and therewith only activates these specific regions. For a IR/NIR process it is possible to use protection devices as well, which cover areas, that should not be activated. In addition it is possible to direct the IR/NIR radiation in a focused way on the adhesive tape. Other possibilities to achieve the claimed effect are to change the material of the item in such a way, that the heat activatable layer does not bond to it. If the item is for example a seal, it is possible to make certain areas of the seal harder than other areas. The hardened areas are the once, where the adhesive tape does not bond to. Yet another option is to shape the item such that the adhesive tape does not bond to it over it's entire width.

Use

The composite article according to the present invention may be adhered to a wide variety of substrates. If the item of the composite article is a shaped rubber, for example a rubber seal or a rubber gasket, the composite article may be used in the automotive industry, thus it may be attached to different kind of substrates, such as for example metal vehicle body parts, plastic vehicle body parts, glass parts of the vehicle, painted and unpainted metal vehicle body parts etc.

The invention will now be described in more detail with reference to the following Figures exemplifying particular embodiments of the invention:

Herein below various embodiments of the present invention are described and shown in the drawings wherein like elements are provided with the same reference numbers.

Figure 1:
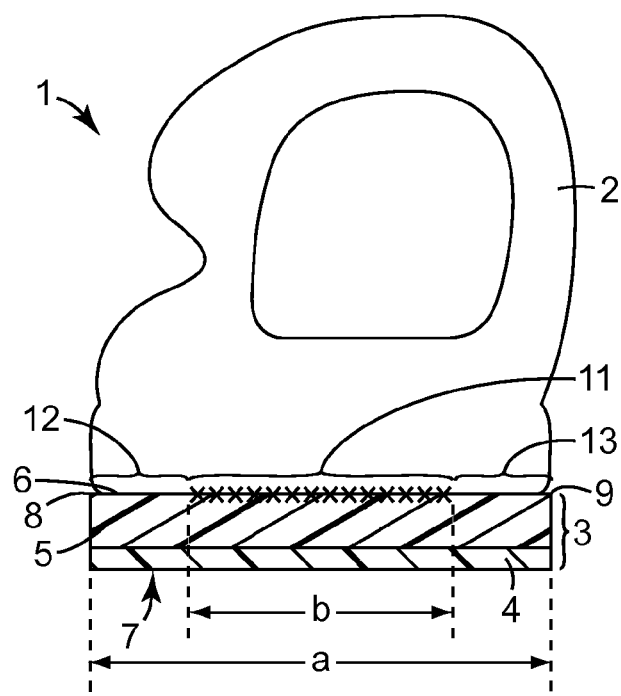
FIG. 1 is a cross sectional view of one embodiment of a composite article according to the invention.

FIG. 1 is a cross sectional view of one embodiment of composite article 1 according to the invention. The composite article 1 comprises a shaped rubber article 2. Shaped rubber articles are frequently used for the preparation of gaskets and automotive weatherstrip seals. They are typically attached to a respective surface like, for example, an automobile frame by means of an adhesive tape.

The composite article 1 according to the invention comprises an adhesive tape 3 for attaching the shaped rubber article 2 to a substrate. The adhesive tape 3 comprises a heat-activatable adhesive layer 5 and a pressure-sensitive adhesive layer 4, wherein the heat-activatable adhesive layer 5 faces the shaped rubber article 2. The adhesive tape 3 has an elongated shape with a first main surface 6 facing to the shaped rubber article 2 and a second main surface 7 opposite the first main surface 6 facing the opposite direction as the first main surface 6. The first surface of the adhesive tape 3 extends from a first edge 8 to a second edge 9.

In the cross sectional view of FIG. 1 the width a of the heat-activatable adhesive layer 5 is equal to the width a of the pressure-sensitive adhesive layer 4, such that this width is also equal to the width a of the first main surface 6 and the second main surface 7.

The composite article 1 according to the invention further comprises a lamination region 11, wherein the adhesive tape 3 is laminated to the shaped rubber article 2 at the lamination region 11. The width b of the lamination region 11 is smaller as the width a of the first surface 6 of the adhesive tape 3. In this embodiment, the lamination region 11 is arranged in the middle of the first surface 6, such that at every edge 8 and 9 of the adhesive tape 3 a region 12 and 13 exists, where the adhesive tape 3 is not laminated to the shaped rubber article 2.

Figure 2:
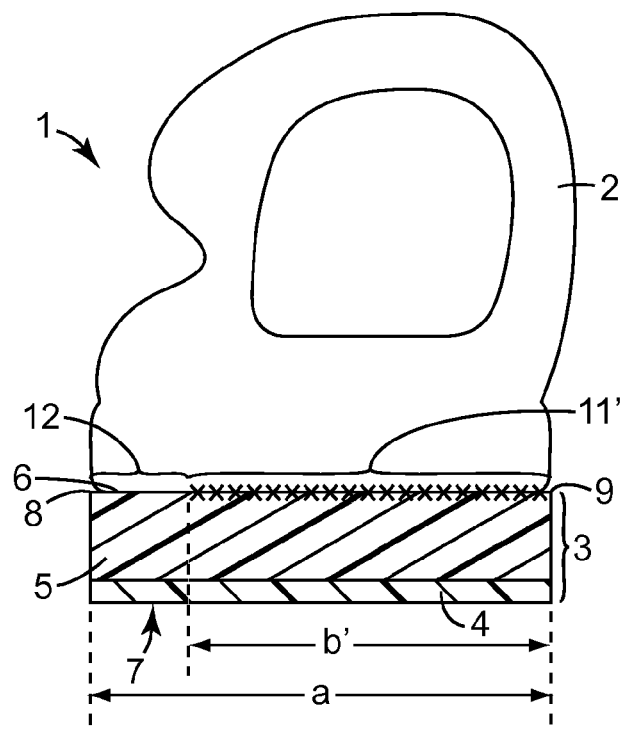
FIG. 2 is a cross sectional view of another embodiment of a composite article according to the invention.

FIG. 2 is a cross sectional view of another embodiment of a composite article 1 according to the invention. The embodiment shown in FIG. 2 only differs in the position and the width of the lamination region 11' from the embodiment shown in FIG. 1. The lamination region 11' in FIG. 2 extends from the edge region 12 up to the edge 9 of the adhesive tape 3 such that in this embodiment only one edge region 12 at one side of the adhesive tape 3 exists. The width b' of the lamination region 11' is still smaller than the width a of the first surface 6 of the adhesive tape 3.

Figure 3:
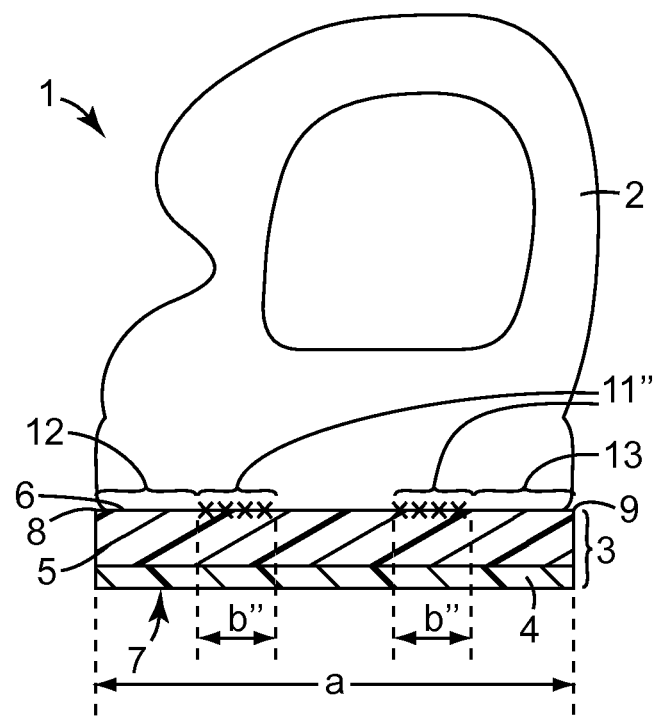
FIG. 3 is a cross sectional view of another embodiment of a composite article according to the invention.

FIG. 3 is a cross sectional view of another embodiment of a composite article 1 according to the invention. The embodiment shown in FIG. 3 only differs in the position and the width of the lamination region 11" from the embodiments shown in FIGS. 1 and 2. The lamination region 11" in FIG. 3 extends over two areas and is discontinuous in the cross section shown in FIG. 3. The width b" of the lamination region 11" is indicated.

The invention claimed is:

1. A composite article comprising:
    an item (2) to be attached to a substrate; and
    an adhesive tape (3) for attaching the item (2) to the substrate, the adhesive tape (3) having a substantially flat shape with a first main surface (6) facing the item (2), the first main surface (6) extending in a cross section perpendicular to the first main surface (6) from a first edge (8) to a second edge (9);
    a lamination region (11) on the first main surface (6), wherein the lamination region (11) is the region where the adhesive tape (3) is laminated to the item (2); and
    wherein the lamination region (11) is continuous and smaller than the first main surface (6).

2. The composite article according to claim 1, wherein the item (2) to be attached to a substrate is a shaped rubber article.

3. The composite article according to claim 1, wherein the substrate is a motor vehicle body.

4. The composite article according to claim 1, wherein the adhesive tape (3) for attaching the item (2) to the substrate comprises a heat-activatable adhesive layer (5) and a pressure-sensitive adhesive layer (4), wherein the heat-activatable adhesive layer faces the item and is laminated to the item.

5. The composite article according to claim 4, wherein the heat-activatable adhesive layer (5) is a resin layer, wherein the resin is a polymer of one or more monomers selected from the group consisting of olefins.

6. The composite article according to claim 4, wherein the pressure-sensitive adhesive layer (4) comprises an acrylic pressure sensitive adhesive.

7. A motor vehicle comprising the composite article according to claim 1.

8. A composite article comprising:
    an item (2) to be attached to a substrate; and
    an adhesive tape (3) for attaching the item (2) to the substrate, the adhesive tape (3) having a substantially flat shape with a first main surface (6) facing the item (2), the first main surface (6) extending in a cross section perpendicular to the first main surface (6) from a first edge (8) to a second edge (9);
    a lamination region (11) on the first main surface (6), wherein the lamination region (11) is the region where the adhesive tape (3) is laminated to the item (2); and
    wherein the lamination region (11) is smaller than the first main surface (6), and wherein the lamination region (11) is arranged such that the cross section thereof perpendicular to the first main surface (6) has the same distance to the first edge (8) as to the second edge (9), providing on each side regions (12) and (13) where the adhesive tape (3) is not laminated to the item (2).

9. A method of making a composite article according to claim 1, comprising the steps of:
    providing the item (2) to be attached to the substrate;
    providing the adhesive tape (3) for attaching the item (2) to the substrate, the adhesive tape (3) having a substantially flat shape with the first main surface (6) facing the item (2);
    laminating the adhesive tape (3) to the item (2), such that the lamination region (11) between the item (2) and the adhesive tape (3), where the adhesive tape (3) is laminated to the item (2), is continuous and smaller than the first main surface.

10. The method of making the composite article according to claim 9, wherein the adhesive tape (3) is activated by Infrared and/or Near-Infrared.

11. The method of making the composite article according to claim 10, wherein a masking method or focusing is used to selectively activate the lamination region (11).

* * * * *